United States Patent
Nishida et al.

(10) Patent No.: US 12,013,254 B2
(45) Date of Patent: Jun. 18, 2024

(54) CONTROL DEVICE

(71) Applicants: MICWARE CO., LTD., Kobe (JP); TOYOTA JIDOSHA KABUSHIKI KAISHA, Toyota (JP)

(72) Inventors: Hiroto Nishida, Kobe (JP); Kanon Suzuki, Kobe (JP); Taiki Nakamura, Nagoya (JP)

(73) Assignees: MICWARE CO., LTD. (JP); TOYOTA JIDOSHA KABUSHIKI KAISHA (JP)

( * ) Notice: Subject to any disclaimer, the term of this patent is extended or adjusted under 35 U.S.C. 154(b) by 164 days.

(21) Appl. No.: 17/018,068

(22) Filed: Sep. 11, 2020

(65) Prior Publication Data
US 2021/0088352 A1    Mar. 25, 2021

(30) Foreign Application Priority Data

Sep. 19, 2019  (JP) .................................. 2019-170780

(51) Int. Cl.
*B60R 1/00*    (2022.01)
*B60W 50/14*    (2020.01)
(Continued)

(52) U.S. Cl.
CPC ..... *G01C 21/365* (2013.01); *G08G 1/096861* (2013.01); *G08G 1/167* (2013.01)

(58) Field of Classification Search
CPC ... B60R 1/00; B60W 50/14; B60W 2050/146; G02B 27/0101; G02B 2027/014;
(Continued)

(56) References Cited

U.S. PATENT DOCUMENTS

2014/0253310 A1*  9/2014  Tippelhofer .......... G06F 3/0481
                                                    340/439
2014/0266656 A1   9/2014  Ng-Thow-Hing et al.
(Continued)

FOREIGN PATENT DOCUMENTS

CN       107139930 A     9/2017
CN       109398359 A     3/2019
(Continued)

OTHER PUBLICATIONS

Office Action dated Aug. 24, 2021 issued in a corresponding Japanese Patent Application No. 2019-170780, (9 pages).
(Continued)

*Primary Examiner* — Ian Jen
*Assistant Examiner* — Hossam M Abd El Latif
(74) *Attorney, Agent, or Firm* — Foley & Lardner LLP

(57) ABSTRACT

An object is to display an image related to transportation guidance in a way easily viewable to a driver. A control section controls a projection device configured to project an image onto a windshield of a vehicle so that the image is displayed superimposed on a real view. The control section includes a projection control section configured to cause, in a case where a driving lane of the vehicle is a reduced lane, the projection device to project a guidance image for prompting a lane change. The reduced lane is a lane on which it becomes impossible for the vehicle to run within a predetermined distance ahead of a current location of the vehicle on a traveling route of the vehicle.

12 Claims, 10 Drawing Sheets

(51) Int. Cl.
   *G01C 21/36*   (2006.01)
   *G02B 27/01*   (2006.01)
   *G08G 1/0968*  (2006.01)
   *G08G 1/16*    (2006.01)
   *G09G 5/377*   (2006.01)

(58) Field of Classification Search
   CPC .............. G01C 21/365; G01C 21/3658; G08G 1/096861; G08G 1/167; G08G 5/377
   USPC ......................................................... 701/436
   See application file for complete search history.

(56) References Cited

U.S. PATENT DOCUMENTS

| | | | |
|---|---|---|---|
| 2014/0267263 A1 | 9/2014 | Beckwith et al. | |
| 2016/0121794 A1* | 5/2016 | Iguchi | B60R 11/04 345/7 |
| 2017/0334460 A1 | 11/2017 | Arakawa et al. | |
| 2018/0099676 A1* | 4/2018 | Goto | B62D 15/0255 |
| 2018/0251155 A1 | 9/2018 | Chan | |
| 2019/0047561 A1 | 2/2019 | Nishiguchi et al. | |
| 2019/0291642 A1* | 9/2019 | Chae | G06T 7/30 |
| 2019/0359228 A1 | 11/2019 | Banno et al. | |
| 2020/0082725 A1* | 3/2020 | Ichinokawa | G08G 1/0969 |
| 2021/0146937 A1* | 5/2021 | Sugiura | G05D 1/0253 |
| 2022/0058998 A1* | 2/2022 | Yagyu | G09G 3/002 |
| 2022/0107201 A1* | 4/2022 | Yagyu | G01C 21/365 |
| 2022/0118983 A1* | 4/2022 | Yagyu | B60W 30/18163 |

FOREIGN PATENT DOCUMENTS

| | | | |
|---|---|---|---|
| JP | 09-128689 A | | 5/1997 |
| JP | 2011-145756 A | | 7/2011 |
| JP | 2014-210568 A | | 11/2014 |
| JP | 2015-120395 A | | 7/2015 |
| JP | 2017-032441 A | | 2/2017 |
| JP | 2017032441 A | * | 2/2017 |
| JP | 2017-097495 A | | 6/2017 |
| JP | 2017-210034 A | | 11/2017 |
| JP | 2018-127204 A | | 8/2018 |
| JP | 2018-200626 A | | 12/2018 |
| JP | 2019-012483 A | | 1/2019 |

OTHER PUBLICATIONS

Notice of Reasons for Refusal issued in corresponding Japanese Patent Application No. 2019-170780 dated Mar. 8, 2022.

Office Action issued in corresponding Chinese Patent Application No. 202010977859.3 dated Feb. 29, 2024 (15 pages).

* cited by examiner

CONTROL DEVICE

This Nonprovisional application claims priority under 35 U.S.C. § 119 on Patent Application No. 2019-170780 filed in Japan on Sep. 19, 2019, the entire contents of which are hereby incorporated by reference.

TECHNICAL FIELD

The present invention relates to a control device for controlling a projection device.

BACKGROUND ART

A variety of head up displays (HUDs) have been developed for projecting information related to transportation guidance onto a reflective surface such as a windshield of an automobile. For example, Patent Literature 1 discloses a technique of projecting an image, which is based on route guidance information, onto a windshield with use of a HUD.

CITATION LIST

Patent Literature

[Patent Literature 1] Japanese Patent Application Publication, Tokukai, No. 2015-120395
[Patent Literature 2] Japanese Patent Application Publication, Tokukai, No. 2014-210568
[Patent Literature 3] Japanese Patent Application Publication, Tokukai, No. 2019-012483

SUMMARY OF INVENTION

Technical Problem

It is an important issue in a navigation system of an automobile to provide transportation guidance in a manner easily understandable to a driver. It is an object of one aspect of the present invention to display an image related to transportation guidance in a way easily viewable to a driver.

Solution to Problem

A control device in accordance with an aspect of the present invention is a control device for controlling a projection device configured to project an image onto a windshield of a vehicle so that the image is displayed superimposed on a real view. The control device includes a projection control section configured to cause, in a case where a driving lane of the vehicle is a reduced lane, the projection device to project a guidance image for prompting a lane change. The reduced lane is a lane on which it becomes impossible for the vehicle to run within a predetermined distance ahead of a current location of the vehicle on a traveling route of the vehicle.

Advantageous Effects of Invention

According to one aspect of the present invention, it is possible to display an image related to transportation guidance in a way easily viewable to a driver.

DESCRIPTION OF EMBODIMENTS

Projection systems in accordance with embodiments of the present invention are each a system which consists of a projection device and a control device configured to control the projection device and which is configured to project an image related to transportation guidance onto a windshield of a vehicle. The following will describe the present invention in detail with reference to Embodiments 1 to 4 as an example.

Embodiment 1

Configurations of Main Parts

Figure 1:
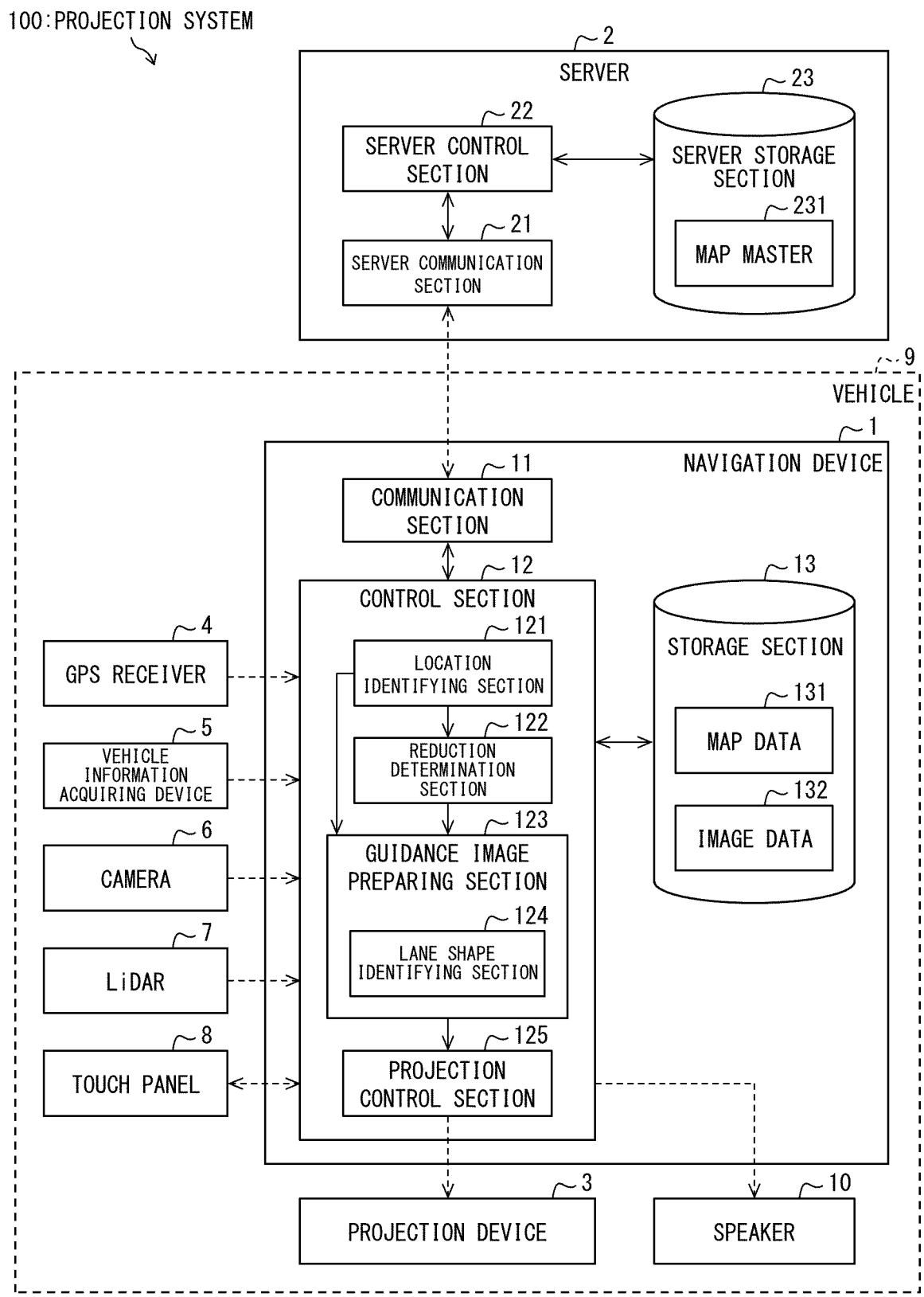
FIG. 1 is a block diagram illustrating configurations of main parts of various devices included in a projection system in accordance with Embodiment 1 of the present invention.

The following description will discuss Embodiment 1 of the present invention. FIG. 1 is a block diagram illustrating configurations of main parts of various devices included in a projection system 100 in accordance with Embodiment 1. The projection system 100 includes at least a navigation device 1 and a projection device 3. The projection system 100 may further include at least one of: a server 2; a GPS receiver 4; a vehicle information acquiring device 5; a camera 6; a light detection and ranging (LiDAR) 7; a touch panel 8; and a speaker 10.

The navigation device 1 is connected, via wired or wireless connection, to the server 2, the projection device 3, the GPS receiver 4, the vehicle information acquiring device 5, the camera 6, the LiDAR 7, the touch panel 8, and the speaker 10. The navigation device 1, the projection device 3, the GPS receiver 4, the vehicle information acquiring device 5, the camera 6, the LiDAR 7, the touch panel 8, and the speaker 10 are devices mounted in a vehicle 9. In Embodiment 1, it is assumed that the vehicle 9 is an automobile.

The touch panel 8 is a device in which an input device and a display device are integrally configured. The touch panel 8 receives a user's touch operation. The touch panel 8 presents various types of information to a user. The touch panel 8 may be realized by an input device constituted by a physical button or keyboard and a display device.

The touch panel 8 supplies to the navigation device 1 information indicative of content of a user operation. The content of the user operation received by the touch panel 8 is not particularly limited. Further, there is no particular limitation on content displayed by the touch panel 8. For example, the touch panel 8 may receive an input operation designating at least one of a starting place and a destination in a case where the navigation device 1 has a route search function. The touch panel 8 may then display a result of a search for a route from a current location or the starting place to the destination.

The speaker 10 is an output device that outputs a sound in accordance with control by the navigation device 1. The speaker 10 may output a sound related to navigation from a starting place or a current location to a destination in a case where the navigation device 1 has a route search function. Further, the speaker 10 may output a sound related to transportation guidance, such as an audio guidance for making a lane change, in accordance with control by the navigation device 1.

The GPS receiver 4 receives a global positioning system (GPS) signal transmitted from a satellite at predetermined time intervals. The GPS signal includes location information indicative of a longitude and latitude of a location where the vehicle 9 is present. The GPS receiver 4 transmits the location information to the control section 12 of the navigation device 1.

The vehicle information acquiring device 5 acquires vehicle information and transmits the vehicle information to the control section 12 of the navigation device 1. The vehicle information indicates various types of information related to an operation of the vehicle 9, such as vehicle speed pulse, inclination, and acceleration. The vehicle information acquiring device 5 may be, for example, at least one of a vehicle speed pulse generator, a gyroscope, and an acceleration sensor.

The camera 6 is a camera that captures an image of at least one of an interior and an exterior of the vehicle 9. The camera 6 may be a single camera. The camera 6 may be a group of cameras capturing images of respective different views. An image captured by the camera 6 may be a still image or a moving image.

For example, the camera 6 may include a front camera that captures an image of a traveling direction of the vehicle 9. The camera 6 may also include a vehicle interior camera that captures the interior of the vehicle 9. More specifically, the vehicle interior camera may, for example, capture an image of a driver's face or upper body. The camera 6 may also include a back camera that captures an image of a view behind the vehicle 9.

The LiDAR 7 is a sensor attached to the exterior of the vehicle 9. The LiDAR 7 emits a laser beam toward an area surrounding the vehicle 9 and measures a length of time required for the laser beam thus emitted to return to the LiDAR 7 by being reflected by an object. The LiDAR 7 transmits information indicative of a result of recognition to the control section 12.

A direction in which the laser beam is emitted from the LiDAR 7, a reflectance of the laser beam, and the length of time thus measured can be used to detect a distance from the vehicle 9 to the object and a direction of the object. In Embodiment 1, the LiDAR 7 is used to recognize a situation ahead of the vehicle 9. For example, the LiDAR 7 may measure a reflectance of a beam on a front side of the vehicle 9 and supply information indicative of the reflectance to the control section 12.

Navigation Device 1

The navigation device 1 is configured to provide guidance regarding a route on a map from a current location or a designated starting place to a destination. The navigation device 1 can provide transportation guidance to a driver by controlling image projection carried out by the projection device 3. The navigation device 1 may also have a route search function for searching for a route on a map from a current location or a designated starting place to a destination. The navigation device 1 includes a communication section 11, a control section (control device) 12, and a storage section 13. The communication section 11 and the storage section 13 are not essential components.

The communication section 11 carries out communications between the navigation device 1 and the server 2. For example, the communication section 11 may receive latest map data from the server 2 and supply the latest map data to the control section 12. The communication section 11 may also receive a request for latest map data from the control section 12 and transmit the request to the server 2.

The control section 12 carries out overall control of the navigation device 1. Further, the control section 12 acquires various types of information from devices external to the navigation device 1. For example, the control section 12 acquires location information from the GPS receiver 4. For example, the control section 12 acquires vehicle information from vehicle information acquiring device 5.

For example, the control section 12 acquires an image captured by the camera 6. For example, the control section acquires information indicative of various types of results of recognition by the LiDAR 7. The control section 12 includes a location identifying section 121, a reduction determination section 122, a guidance image preparing section 123, and a projection control section 125. Further, the control section 12 may control the speaker 10 to output a sound.

The location identifying section 121 determines a current location of the vehicle 9 in a lane on which the vehicle 9 is running on the basis of location information received from the GPS receiver 4. Hereinafter, a lane on which the vehicle 9 is running will be simply referred to as a "driving lane." Further, a current location of the vehicle 9 in a driving lane will be simply referred to as a "current location." The location identifying section 121 supplies information indicative of a current location to the reduction determination section 122 and the guidance image preparing section 123.

The location identifying section 121 identifies a current location at predetermined time intervals. Each time the location identifying section 121 identifies a current location, the location identifying section 121 supplies the current location to the reduction determination section 122 and the guidance image preparing section 123. This allows the location identifying section 121 to constantly monitor a current location of the vehicle 9. The location identifying section 121 does not need to identify a current location when the vehicle 9 is stopped or when the vehicle 9 is running in a particular location (e.g., in a parking lot) in map data 131.

The method by which the location identifying section 121 identifies a current location is not particularly limited. For example, the location identifying section 121 may identify a current location by carrying out map matching on the basis of location information received from the GPS receiver 4 and a map indicated by the map data 131.

Further, the location identifying section 121 may identify a current location in accordance with at least one of vehicle information received from the vehicle information acquiring device 5, a captured image received from the camera 6, and a result of recognition by the LiDAR 7 received from the LiDAR 7.

For example, the location identifying section 121 may (i) identify a vehicle speed of the vehicle 9 from information indicative of a vehicle speed pulse, (ii) determine a distance by which the vehicle 9 has advanced between a time at which location information was acquired and a current time, and (iii) then identify a current location on the basis of both the distance and the location information.

Further, for example, the location identifying section 121 may identify, from a captured image acquired from the front camera serving as the camera 6, at least one of the following various types of information: a position and width of a lane division line on a road ahead of the vehicle 9, a position of a traffic light, a content and position of a road sign, a position and content of a sign of a facility. The location identifying section 121 may then identify a current location of the vehicle 9 by comparing various types of information thus identified, location information, and the map data 131 with one another. This allows the location identifying section 121 to identify a current location more precisely.

Further, for example, the location identifying section 121 may identify, from information indicative of a reflectance and acquired from the LiDAR 7, at least one of a position and width of a lane division line on a road ahead of the vehicle 9, a shape of the road, and a gradient of the road. The location identifying section 121 may then identify a current location of the vehicle 9 by comparing various types of information thus identified, location information, and the map data 131 with one another. This allows the location identifying section 121 to identify a current location more precisely.

The reduction determination section 122 determines whether or not the driving lane is a reduced lane. Note here that the "reduced lane" refers to a lane on which it becomes impossible for the vehicle 9 to run within a predetermined distance ahead of the current location on a traveling route of the vehicle 9. Note that the "lane on which it becomes impossible for the vehicle 9 to run" may encompass both a lane on which it will become physically impossible for the vehicle 9 to run and a lane on which the vehicle 9 will be prohibited from running under the Road Trucking Vehicle Law. The "traveling route" refers to a route on which the vehicle 9 is running and a route on which the vehicle 9 will run.

For example, the reduced lane is a lane that disappears when integrated into another lane within a predetermined distance ahead of the vehicle 9. In another example, the reduced lane is a left-turn lane or a right-turn lane in a case where the vehicle 9 follows a traveling route that runs straight along the road. The reduction determination section 122 supplies a result of determination to the guidance image preparing section 123. Determination by the reduction determination section 122 is repeated at predetermined time intervals. This allows the control section 12 to constantly monitor whether or not the vehicle 9 is running on a reduced lane. The reduction determination section 122 does not need to determine whether the driving lane is a reduced lane when the vehicle 9 is stopped or when the vehicle 9 is running in a particular location (e.g., in a parking lot) in the map data 131.

Note that the specific method by which the reduction determination section 122 makes the determination is not particularly limited. For example, the reduction determination section 122 may identify a current traveling direction of the vehicle 9. For example, the reduction determination section 122 may identify a current traveling direction of the vehicle 9 on the basis of change over time in the current location which is received from the location identifying section 121 each time the location identifying section 121 identifies the current location. Further, for example, the reduction determination section 122 may (i) identify, by referring to the map data 131, a direction in which vehicles are supposed to travel on the driving lane and (ii) set this direction to be a current traveling direction of the vehicle 9.

Then, the reduction determination section 122 may determine whether or not the driving lane will disappear on the map within a predetermined distance ahead of the current location by referring to the map data 131. Here, in a case where the driving lane will disappear within the predetermined distance ahead of the current location, the reduction determination section 122 determines that the driving lane is a reduced lane. In a case where the driving lane will not disappear within the predetermined distance ahead of the current location, the reduction determination section 122 determines that the driving lane is not a reduced lane.

Further, for example, the reduction determination section 122 may identify a traveling route of the vehicle 9 on the basis of a route from a current location or a starting place to a destination. The navigation device 1 can obtain this route by receiving the route from the server 2 or the like or using the route search function of the navigation device 1. In this case, the reduction determination section 122 determines that a lane on which it becomes impossible for the vehicle 9 to run on the traveling route thus identified is a reduced lane. For example, the reduction determination section 122 may determine that a dedicated lane for advancing in a direction that differs from the traveling route which has been identified (e.g., a right-turn lane and a left-turn lane in a case where the vehicle 9 travels straight) is a reduced lane.

Note that the reduction determination section 122 may determine whether the driving lane is a reduced lane in accordance with at least one of: vehicle information received from the vehicle information acquiring device 5; a captured image received from the camera 6; and a result of measurement by the LiDAR 7 received from the LiDAR 7. For example, the reduction determination section 122 may (i) recognize, from a captured image acquired from the front camera serving as the camera 6, a shape of a road ahead of the vehicle 9 and whether the road is an uphill or a downhill and (ii) determine whether or not the driving lane is a reduced lane on the basis of both a result of recognition and location information. Note that the shape of the road ahead of the vehicle 9 and whether the road is an uphill or a downhill can also be identified from information indicative of a reflectance on the front side of the vehicle 9 acquired from the LiDAR 7.

The guidance image preparing section 123 prepares a guidance image in a case where the guidance image preparing section 123 receives from the reduction determination section 122 a result of determination indicating that a driving lane is a reduced lane. The "guidance image" is an image which is related to transportation guidance and to be used for prompting a lane change. The guidance image preparing section 123 supplies the guidance image which has been prepared to the projection control section 125.

The specific content of the guidance image is not particularly limited. For example, the guidance image may be a moving image. The guidance image may also indicate a character string. In a case where the guidance image is a moving image, the guidance image preparing section 123 sequentially prepares frame images of the moving image and supplies the frame images to the projection control section 125.

Further, the guidance image preparing section 123 may read out a guidance image from the image data 132 instead of preparing image data by itself. Then, the guidance image preparing section 123 may supply the guidance image thus read out to the projection control section 125. Further, the guidance image preparing section 123 may read out a template of a guidance image from the image data 132, subject the template to various editing processes such as enlarging, reducing, and changing colors, and then supply the guidance image thus edited to the projection control section 125.

In Embodiment 1, the guidance image preparing section 123 prepares a colored image. A "colored image" is a type of guidance image which is colored and, when projected onto the windshield, has the same shape as a shape of a reduced lane in a real view.

Note that a "shape of a reduced lane in a real view" here refers to a shape of a reduced lane in a real view as seen from a driver. The term "same" herein does not necessarily mean being perfectly identical. The term "same" herein encompasses a degree of coincidence that can be recognized as having substantially the same shape as the reduced lane as seen from the driver. For example, the colored image may be shaped such that the colored image looks congruent or similar to the reduced lane from the driver when projected onto the windshield.

The colored image may be colored differently from a color of the reduced lane. There is no particular limitation as to (i) a color of the colored image and (ii) whether or not the colored image is accompanied by effects such as a visual effect and an animation effect. More preferably, the colored image is a translucent image so as not to obscure a road sign of the reduced lane.

In a case where the guidance image preparing section 123 is configured to prepare a colored image, the guidance image preparing section 123 includes a lane shape identifying section 124. In a case where the driving lane is a reduced lane, the lane shape identifying section 124 identifies a shape of the reduced lane in the real view on the basis of a current location identified by the location identifying section 121. Note that the term "reduced lane" here is not limited to a driving lane of the vehicle 9. The lane shape identifying section 124 may identify shapes of all reduced lanes visible in the real view, on the basis of the traveling route of the vehicle 9. Note that the "real view" herein refers to a real view that is visible to a driver of the vehicle 9 through the windshield. The specific method for identifying a shape of a reduced lane is not particularly limited. For example, the lane shape identifying section 124 may identify a shape of a reduced lane in the real view on the basis of a current location and a shape and gradient of the reduced lane in the map data 131 stored in the storage section 13.

Further, the lane shape identifying section 124 may identify a shape of a reduced lane in a real view by taking account of at least one of vehicle information received by the control section 12 from the vehicle information acquiring device 5, a captured image received by the control section 12 from the camera 6, and a result of recognition by the LiDAR 7 received from the LiDAR 7.

For example, the lane shape identifying section 124 may identify a detailed orientation or inclination of the vehicle 9 relative to a reduced lane on the basis of information indicative of an inclination or acceleration acquired from the vehicle information acquiring device 5. Note that the lane shape identifying section 124 may identify the detailed orientation or inclination from a captured image acquired from the front camera serving as the camera 6. The lane shape identifying section 124 may then identify a shape of the reduced lane in the real view on the basis of the detailed orientation or inclination and a shape and gradient of the reduced lane in the map data 131.

When the lane shape identifying section 124 identifies a shape of a reduced lane, the guidance image preparing section 123 prepares a colored image having the same shape as the shape thus identified. The specific method for preparing the colored image is not particularly limited. For example, the guidance image preparing section 123 may prepare a colored image by reading out, from the storage section 13, image data 132 that serves as a template of the colored image and correcting a shape of the template in accordance with a shape of the reduced lane in the real view.

Further, for example, the guidance image preparing section 123 may identify a level and direction of eyes of a driver on the basis of a captured image acquired from the vehicle interior camera serving as the camera 6. Then, the guidance image preparing section 123 may determine a shape of a colored image according to the level and direction of the eyes of the driver. This makes it possible to determine a shape of a colored image more precisely.

The projection control section 125 causes the projection device 3 to project a guidance image. The projection control section 125 transmits, to the projection device 3, a guidance image received from the guidance image preparing section 123. At this time, the projection control section 125 may transmit, together with the guidance image, information designating a projection position at which the guidance image thus transmitted is to be projected by the projection device 3.

The projection control section 125 may determine the projection position at which the guidance image is to be projected. For example, the projection control section 125 may identify a level and direction of eyes of a driver on the basis of a captured image acquired from the vehicle interior camera serving as the camera 6. Then, the projection control section 125 may determine the projection position of the guidance image according to the level and direction of the eyes of the driver.

In Embodiment 1, the projection control section 125 determines a projection position of a colored image, which is a type of guidance image, such that the colored image is superimposed on a position at which a reduced lane is provided in a real view. That is, the projection control section 125 determines the projection position of the colored image such that the colored image having the same shape as the reduced lane in the real view is superimposed on the reduced lane.

Note that the guidance image preparing section 123 may determine a projection position of a guidance image. In this case, the guidance image preparing section 123 supplies, to the projection control section 125, a guidance image which has been prepared and information indicative of a projection position of the guidance image. Then, the projection control section 125 transmits the guidance image and the information indicative of the projection position thus received to the projection device 3.

Note that when causing the projection device 3 to project the guidance image, the control section 12 may cause the speaker 10 to output a sound related to the guidance image at the timing of projection of the guidance image. For example, the control section 12 may cause the speaker 10 to output a sound for prompting a lane change.

Route Search Function

In a case where the navigation device 1 has a route search function, the control section 12 carries out a process of updating map data and a route search process in addition to the above described processes. The control section 12 carries out the process of updating map data in such a manner that the control section 12 acquires latest map data from the server 2 and stores the acquired map data in the storage section 13 as the map data 131. This causes the map data 131 in the storage section 13 to be updated. Note that instead of acquiring the entire latest map data, the control section 12 may acquire, from the server 2, differential data indicative of a difference from the map data 131 currently stored in the storage section 13 and update the map data 131 using the difference data.

The control section 12 carries out the route search process in such a manner that the control section 12 refers to the map data 131 to identify a route from a starting place to a destination. The starting place may be a current location identified by the location identifying section 121, or may be a starting place designated by a user via the touch panel 8. The destination may be a destination designated by a user via the touch panel 8. The control section 12 may cause the touch panel 8 to display a result of the route search. The control section 12 may also cause the speaker 10 to output a sound indicative of the path thus identified.

The storage section 13 stores information necessary for various processes carried out by the navigation device 1. For example, the storage section 13 may store the map data 131. The map data 131 is data indicating positions, shapes, lengths, and types of roads on a map. The map data 131 also contains information of the number of lanes running in each direction on a road. Further, for example, the storage section 13 may store the image data 132. The image data 132 is image data of a guidance image which the control section 12 causes the projection device 3 to project or of a template of the guidance image.

Projection Device 3

The projection device 3 is a device for projecting a guidance image with use of the windshield 91 of the vehicle 9 as a head up display. The projection device 3 projects a guidance image, which has been supplied by the projection control section 125, at a position designated by the projection control section 125.

Figure 2:
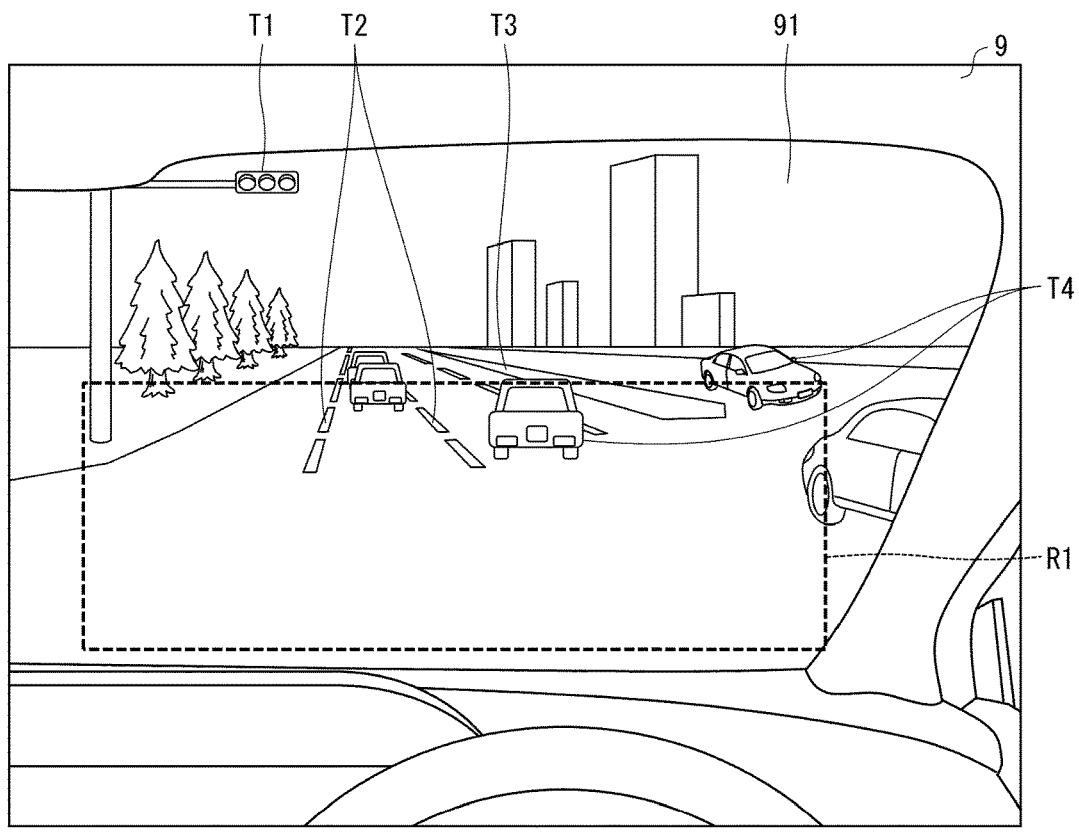
FIG. 2 is a view illustrating a portion of a windshield of a vehicle onto which portion a guidance image is projected.

FIG. 2 is a view illustrating a portion of the windshield of the vehicle 9 onto which portion the guidance image is projected. The projection device 3 should preferably project the guidance image such that the guidance image is contained within a region R1 which occupies a lower half of the windshield 91 illustrated in FIG. 2 and occupies a half of the windshield 91 in a lateral direction. That is, it is preferable that the projection device 3 project the guidance image onto the windshield 91 such that the guidance image is contained within a portion that occupies approximately ¼ of the windshield 91.

For example, in the example illustrated in FIG. 2, a driver of the vehicle 9 needs to run the vehicle 9 while checking a traffic light T1, white lines T2, and a median strip T3, which are road signs, and other vehicles T4. If the guidance image is projected over an excessively large portion of the windshield 91, the line of sight of the driver is likely to move by an excessively long stroke. This is because the driver also needs to pay attention to the guidance image. It is therefore preferable that the guidance image be projected onto a portion within which the guidance image does not interfere with driving of the driver.

By projecting the guidance image such that the guidance image fits in the region R1, it is possible to project the guidance image onto a portion that is easy for the driver to check during driving in terms of human vertical and horizontal viewing angles, without interference with the driving.

Server 2

The server 2 is a device that collects and accumulates latest map data and latest traffic information. In a case where the navigation device 1 has a route search function, the server 2 transmits latest map data to the navigation device 1. The server 2 includes a server communication section 21, a server control section 22, and a server storage section 23.

The server storage section 23 stores information necessary for various operations carried out by the server 2. For example, the server storage section 23 includes a map master 231. The map master 231 is master data that contains the latest map data to be delivered to the navigation device 1. The map master 231 is updated by another system such as a map updating system, or by an operator.

The server control section 22 carries out overall control of the server 2. The server control section 22 extracts, from the map master 231 of the server storage section 23, latest map data to be transmitted to the navigation device 1. The server control section 22 transmits the latest map data thus extracted to the navigation device 1 via the server communication section 21. The timing at which the server control section 22 transmits the latest map data to the navigation device 1 is not particularly limited. For example, the server control section 22 may transmit the map data to the navigation device 1 once a day at a fixed time. Alternatively, the server control section 22 may transmit latest map data in response to a request, received from the navigation device 1 via the server communication section 21, for the latest map data.

The server communication section 21 carries out communications between the server 2 and the navigation device 1. Specifically, the server communication section 21 transmits the latest map data read out by the server control section 22 to the navigation device 1. Further, when the server communication section 21 receives a request for latest map data from the navigation device 1, the server communication section 21 supplies the request to the server control section 22.

Example of Projection of Colored Image

Figure 3:
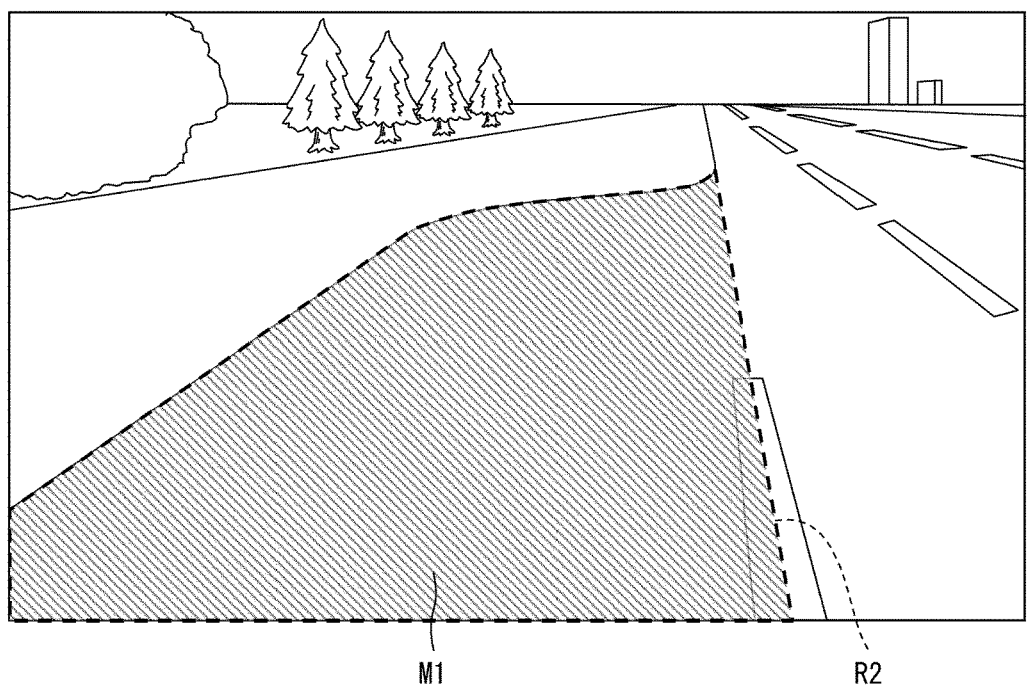
FIG. 3 is a view illustrating an example of a colored image projected onto a windshield of a vehicle.

FIG. 3 is a view illustrating an example of a colored image projected onto the windshield 91 of the vehicle 9. As illustrated in FIG. 3, the vehicle 9 is running on a reduced lane R2. In this case, the projection control section 125 transmits a colored image received from the guidance image preparing section 123 to the projection device 3 together with information designating a projection position of the colored image. The projection device 3 receives the colored image and projects the colored image onto the projection position identified by the information.

As illustrated in FIG. 3, a colored image M1 is projected onto the windshield 91 so as to be superimposed on the reduced lane when viewed from the driver. This makes it possible to give the driver an impression that the driving lane itself is colored. Note that the colored image M1 may be an image that does not include symbols such as characters and icons. In a case where the colored image M1 is an image including no symbols, the driver can intuitively understand the reduced lane without taking the step of interpreting the meanings of the symbols contained in the colored image.

Flow of Process

Figure 4:
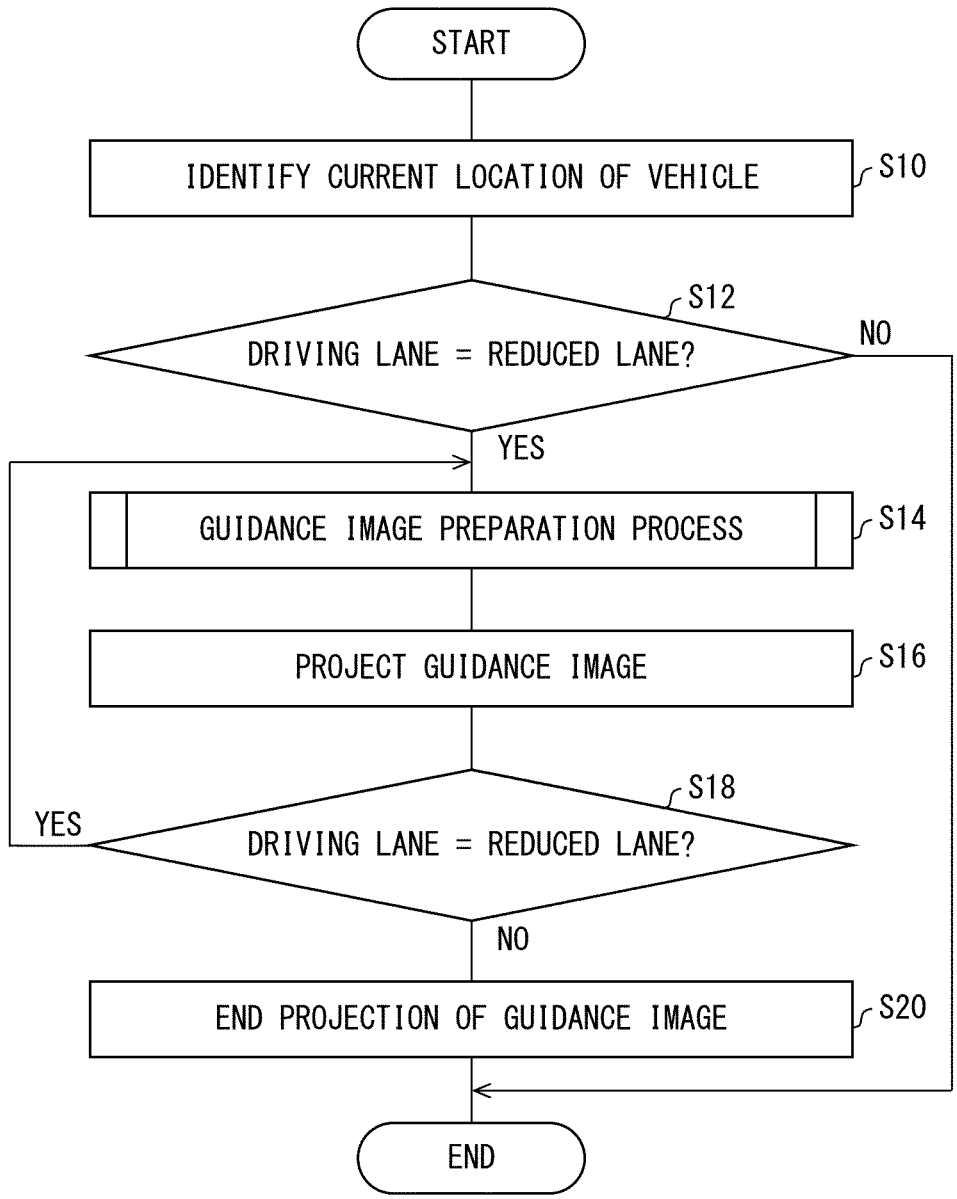
FIG. 4 is a flow chart showing an example of a flow of processes carried out by a control section.

FIG. 4 is a flow chart showing an example of a flow of processes carried out by the control section 12. When the control section 12 receives location information from the GPS receiver 4, the location identifying section 121 of the control section 12 identifies a current location of the vehicle 9 (S10). The location identifying section 121 supplies information indicative of the current location to the reduction determination section 122.

The reduction determination section 122 determines whether or not a driving lane shown at the current location is a reduced lane (S12). The reduction determination section 122 supplies a result of determination to the guidance image preparing section 123. The determination by the reduction determination section 122 is repeated at predetermined time intervals. Each time the reduction determination section 122 carries out a determination process, the reduction determination section 122 supplies a result of determination to the guidance image preparing section 123.

The guidance image preparing section 123 operates in accordance with the result of determination received from the reduction determination section 122. In a case where the reduction determination section 122 determines that the driving lane is not a reduced lane (NO in S12), the control section 12 ends the flow without carrying out processes of steps subsequent to S12. In a case where the reduction determination section 122 determines that the driving lane is a reduced lane (YES in S12), the guidance image preparing section 123 carries out a guidance image preparation process (S14). The "guidance image preparation process" refers to a process of preparing at least one guidance image. Details of the guidance image preparation process will be discussed later. The guidance image preparing section 123 supplies a guidance image thus prepared to the projection control section 125. The projection control section 125 receives the guidance image and causes the projection device 3 to project the guidance image (S16). The projection device 3 may continue projection of guidance images onto the windshield (i) while being supplied with the guidance images from the projection control section 125 or (ii) until receiving an instruction from the projection control section 125 to stop projection of guidance images.

Even after the projection device 3 starts projecting the guidance image, i.e., after S16, the reduction determination section 122 carries out the determination process at predetermined time intervals (S18). After S14, while the driving lane is determined to be a reduced lane (YES in S18), the guidance image preparing section 123 prepares a guidance image at appropriate timing (S14) and supplies the guidance image to the projection control section 125. Then, the projection control section 125 causes the projection device 3 to continue to project the guidance image (S16). On the other hand, in a case where it is determined after S14 that the driving lane is not a reduced lane (NO in S18), the guidance image preparing section 123 stops preparing guidance images. Accordingly, the projection control section 125 stops supplying guidance images to the projection device 3. Alternatively, the projection control section 125 instructs the projection device 3 to stop projecting guidance images. The projection control section 125 thus causes projection of the guidance images by the projection device 3 to be stopped (S20).

The above processes enable projecting a guidance image prompting a lane change onto the windshield 91 in a case where the vehicle 9 is running on a reduced lane. It is thus possible to project a guidance image in such a way that the guidance image is (i) within a field of view of a driver and (ii) superimposed on a real view when viewed from the driver. Thus, it is possible to display an image related to transportation guidance in a way easily viewable to a driver.

Further, with the above processes, it is possible to (i) cause the projection device 3 to start projection of a guidance image at a timing when a lane change of the vehicle 9 is necessary and (ii) end the projection when the lane change to a lane that is not a reduced lane is completed. It is thus possible to prompt a lane change at a timing when the lane change is necessary.

Method for Preparing Colored Image

Figure 5:
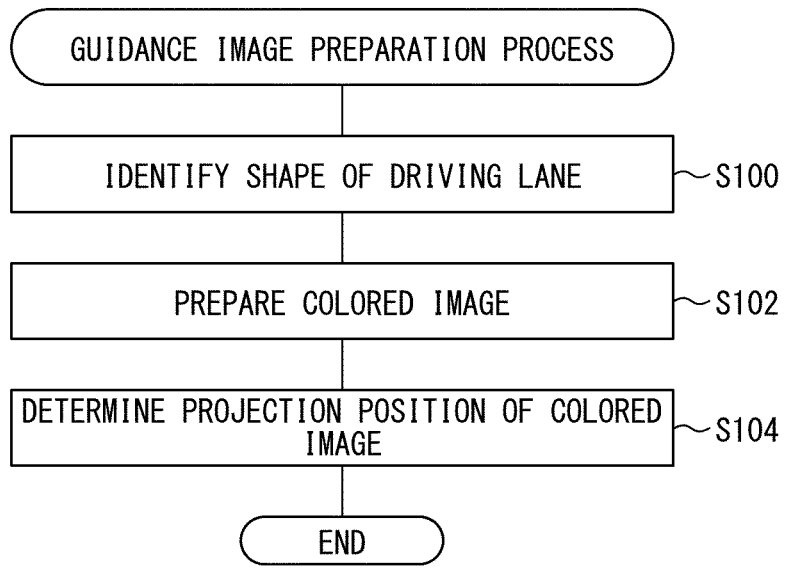
FIG. 5 is a flow chart showing an example of a flow of a guidance image preparation process.

FIG. 5 is a flow chart showing an example of a flow of the guidance image preparation process. FIG. 5 shows an example of a flow of a process carried out in a case of preparing a colored image as a guidance image.

In a case where the driving lane is a reduced lane (YES in S12 of FIG. 4), the lane shape identifying section 124 of the guidance image preparing section 123 identifies a shape of the driving lane in the real view (S100). The guidance image preparing section 123 prepares a colored image in accordance with the shape of the driving lane identified by the lane shape identifying section 124 (S102).

The guidance image preparing section 123 supplies the colored image thus prepared to the projection control section 125. The projection control section 125 determines a projection position of the colored image received from the guidance image preparing section 123 (S104).

Subsequently, as shown in FIG. 4, the projection control section 125 transmits, to the projection device 3, the colored image and information indicative of the projection position of the colored image, and the projection device 3 projects the colored image onto the projection position thus designated.

The above process enables projecting a colored image having the same shape as a driving lane such that the colored image is superimposed at the position at which the driving lane is provided. This allows the driver to recognize the reduced lane intuitively.

Embodiment 2

The guidance image preparing section 123 may prepare a guidance image other than a colored image. The following description will discuss Embodiment 2 of the present invention. For convenience of description, members having functions identical to those discussed in Embodiment 1 are assigned identical referential numerals, and their descriptions are omitted here. The same also applies to the subsequent embodiments.

Figure 6:
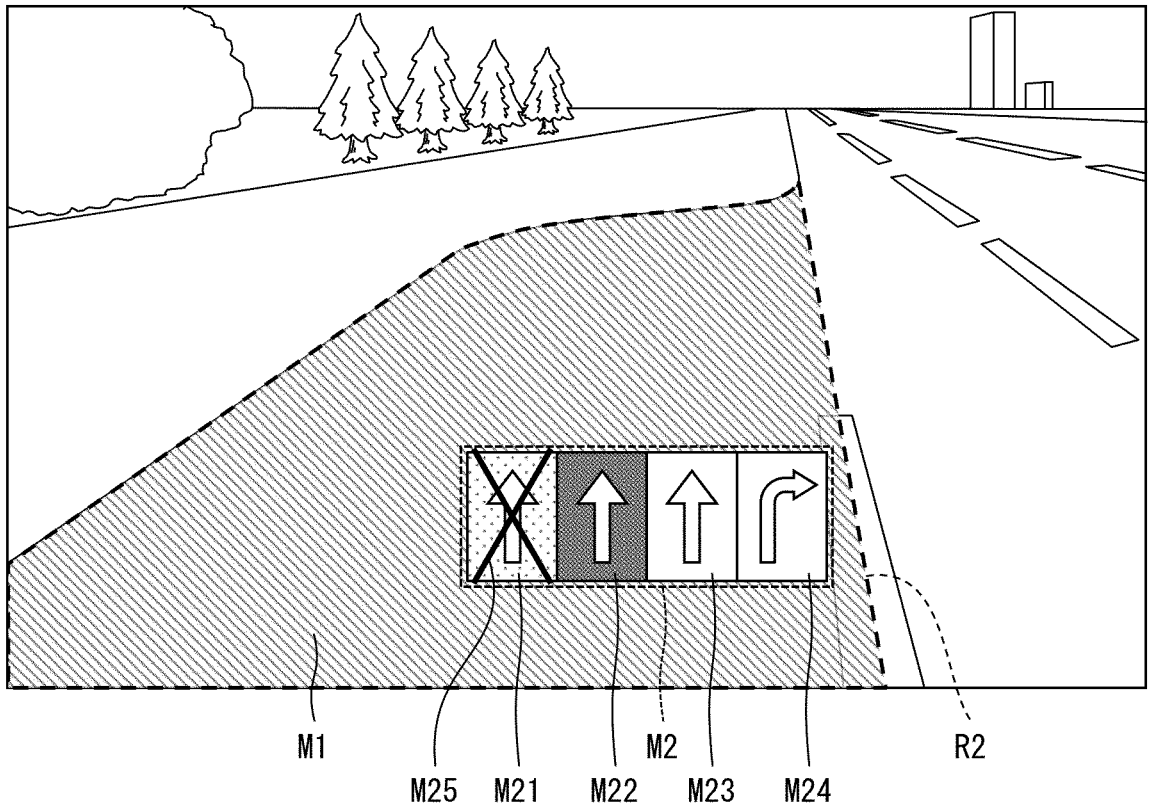
FIG. 6 is a view illustrating an example of a colored image projected onto a windshield of a vehicle.

FIG. 6 is a view illustrating another example of a guidance image projected onto a windshield of a vehicle 9. Note that portions of FIG. 6 that are not specifically described are similar to those of FIG. 3.

In the example illustrated in FIG. 6, a lane guidance image M2 is projected together with a colored image M1 as described in Embodiment 1. The lane guidance image M2 consists of one or more lane icons. Each lane icon indicates information related to a lane on a road on which the vehicle 9 is running.

The number of the lane icons in the lane guidance image M2 indicates the number of lanes that run in a traveling direction of the vehicle 9. In the example illustrated in FIG. 6, the road on which the vehicle 9 is running has four lanes in the traveling direction. Respective positions in which the lane icons M21 through M24 are arranged correspond to respective positions of the four lanes on one side of the road. Each of the lane icons M21 through M24 includes an arrow whose direction indicates whether a corresponding lane is a straight through lane, a right turn lane, or a left turn lane. In the example illustrated in FIG. 6, the rightmost lane on the road is a right turn lane, and the other lanes are straight through lanes.

In the lane guidance image M2, a lane icon corresponding to a reduced lane and a lane icon corresponding to a lane that is not a reduced lane may be distinguished from each other. Specifically, in the lane guidance image M2, the lane icon M21 corresponding to the leftmost lane, which is a reduced lane, has a sign M25 added thereto so as to allow the lane icon M21 to be distinguished from the other three lane icons corresponding to lanes that are not a reduced lane.

This allows the driver to easily recognize the reduced lane when the driver sees the lane guidance image M2 projected on the windshield 91. Thus, the control section 12 can prompt the driver to make a lane change by using the lane guidance image M2.

Further, the lane guidance image M2 may be such that a lane icon corresponding to a driving lane, a lane icon corresponding to a recommended lane, and a lane icon other than these lane icons are distinguished from one another. Note that a "recommended lane" refers to a lane that is recommended as a destination of a lane change from the driving lane. Specifically, in the lane guidance image M2, the lane icon M21, which corresponds to a driving lane, the lane icon M22, which corresponds to a recommended lane adjacent to the driving lane, and each of the lane icons M23 and M24 corresponding to the other lanes have respective different background colors.

This allows the driver to recognize the driving lane and the recommended lane easily when the driver sees the lane guidance image M2. Thus, the control section 12 can prompt the driver to make a lane change by using the lane guidance image M2.

Embodiment 3

In a projection system in accordance with an embodiment of the present invention, in a case where a driving lane is a reduced lane, a control section 12 of a navigation device 1 may identify, on the basis of a current location, a route for making a lane change from the driving lane to a recommended lane which is recommended as a destination of the lane change. Then, the control section may cause a projection device 3 to project, as a guidance image, a route image indicative of the route thus identified. The following description will discuss Embodiment 3 of the present invention.

Configurations of Main Parts

Figure 7:
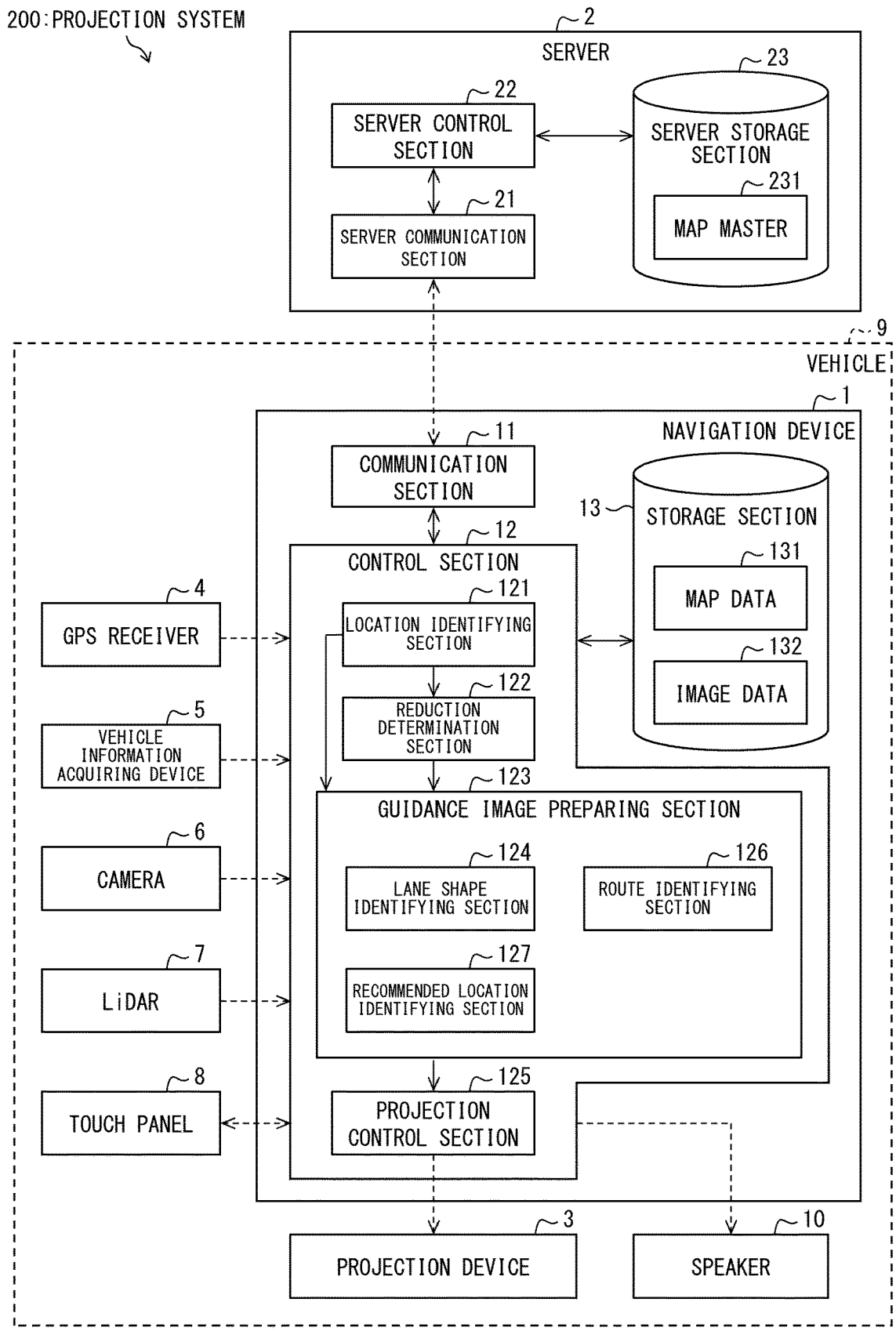
FIG. 7 is a block diagram illustrating configurations of main parts of various devices included in a projection system in accordance with Embodiment 3 of the present invention.

FIG. 7 is a block diagram illustrating configurations of main parts of various devices included in a projection system 200 in accordance with Embodiment 3. The projection system 200 differs from the projection systems 100 in accordance with Embodiments 1 and 2 in that a guidance image preparing section 123 of a control section includes a route identifying section 126 and a recommended location identifying section 127. Note that the recommended location identifying section 127 is not an essential component in Embodiment 3.

In Embodiment 3, the guidance image preparing section 123 prepares a route image as a type of guidance image. The guidance image preparing section 123 in accordance with Embodiment 3 includes at least the route identifying section 126. The guidance image preparing section 123 in accordance with Embodiment 3 may include the recommended location identifying section 127.

The route identifying section 126 identifies, on the basis of a current location, a route for making a lane change from a driving lane to a recommended lane. A "recommended lane" refers to a lane that is recommended as a destination of a lane change made by a vehicle 9 currently running on a reduced lane. The method by which the route identifying section 126 identifies a current location is not particularly limited. For example, the route identifying section 126 may refer to map data 131 to identify (i) the number of lanes on a road ahead of a current location and (ii) types of the lanes. The route identifying section 126 may subsequently identify a recommended lane in accordance with the number and types of the lanes. Then, the route identifying section 126 may identify a route connecting the recommended lane thus identified and the current location.

The recommended location identifying section 127 identifies a start-recommended location in a case where one or more other lanes are present between the driving lane and the recommended lane on the route identified by the route identifying section 126. The start-recommended location is a recommended location from which to start the lane change of the vehicle 9. In other words, the start-recommended location can be said to indicate a timing at which the vehicle 9 makes the lane change. For example, in a case where one other lane is present between the driving lane and the recommended lane, the vehicle 9 makes a lane change twice in order to move to the recommended lane. In this case, the recommended location identifying section 127 may identify a start-recommended location in each of the driving lane and the lane adjacent to the driving lane.

The method for identifying a start-recommended location is not particularly limited. For example, the recommended location identifying section 127 may identify a start-recommended location on the basis of (i) a shape of a road on which the vehicle 9 is running which shape is indicated by the map data 131 and (ii) a speed limit of the road.

Example of Projection of Route Image

Figure 8:
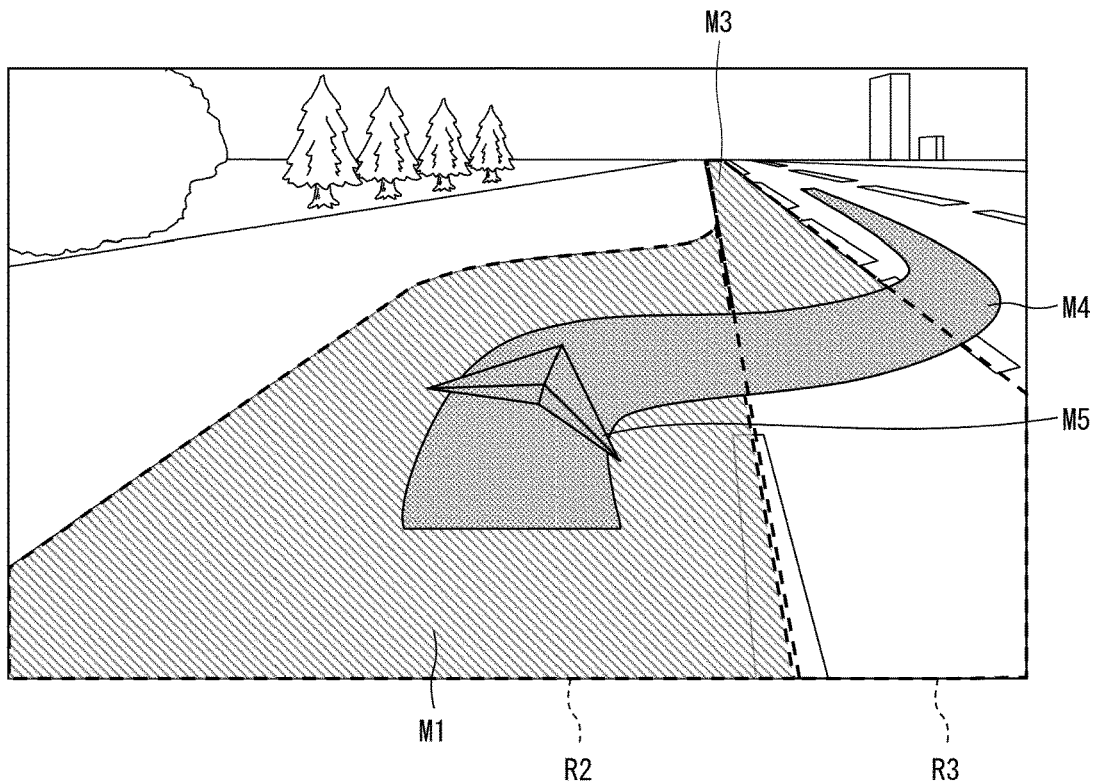
FIG. 8 is a view illustrating an example of a route image projected onto a windshield of a vehicle.

FIG. 8 is a view illustrating an example of a route image projected onto a windshield 91 of the vehicle 9. Note that portions of FIG. 8 that are not specifically described are similar to those of FIG. 3. In the example illustrated in FIG. 8, a lane R2 on which the vehicle 9 is running and a lane R3 adjacent to the lane R2 are reduced lanes.

As described in Embodiment 1, the guidance image preparing section 123 prepares colored images M1 and M3 shaped the same as the respective reduced lanes and supplies the colored images M1 and M3 to a projection control section 125. The guidance image preparing section 123 in accordance with Embodiment 3 also prepares a route image M4 and a route image M5 and supplies the route image M4 and the route image M5 to the projection control section 125.

The projection control section 125 transmits the colored image M1, the colored image M3, the route image M4, and the route image M5 to the projection device 3 together with information designating respective projection positions of these images. The projection device 3 projects these various guidance images thus received onto the respective designated projection positions on the windshield 91.

As illustrated in FIG. 8, the route image M4 and the route image M5 are projected onto the windshield 91 so as to be superimposed on the driving lane when viewed from a driver. This enables prompting the driver to drive along a route thus projected.

Note that it is preferable that the route image M4 and the route image M5 differ in color from the road itself and from an indication of white lines or road signs. This is to prevent confusing a route image, which is a virtual image, with an actual indication of transportation guide in a real view. Displaying the route image M4 and the route image M5 in this manner allows the driver to intuitively understand a route for making a lane change.

Note that the route identifying section 126 may update the route by recalculation at predetermined time intervals. Further, each time the route is updated, the guidance image preparing section 123 may prepare a route image to which a shading effect is added and supply the route image to the projection control section 125. The projection control section 125 may then cause the projection device 3 to project the route image to which the effect is added.

For example, the guidance image preparing section 123 may prepare a route image M4 or a route image M5 that are moving images to which a shading effect is added. By presenting the route images, to which the shading effect is thus added, by projecting the route images, it is possible to direct the driver's attention to the updated route images.

Further, the guidance image preparing section 123 may prepare, as a route image, an image represented by a certain number of lines, the certain number being in accordance with the number of lanes as counted from a driving lane to a recommended lane. The projection control section 125 may then cause the projection device 3 to project the route image.

Figure 9:
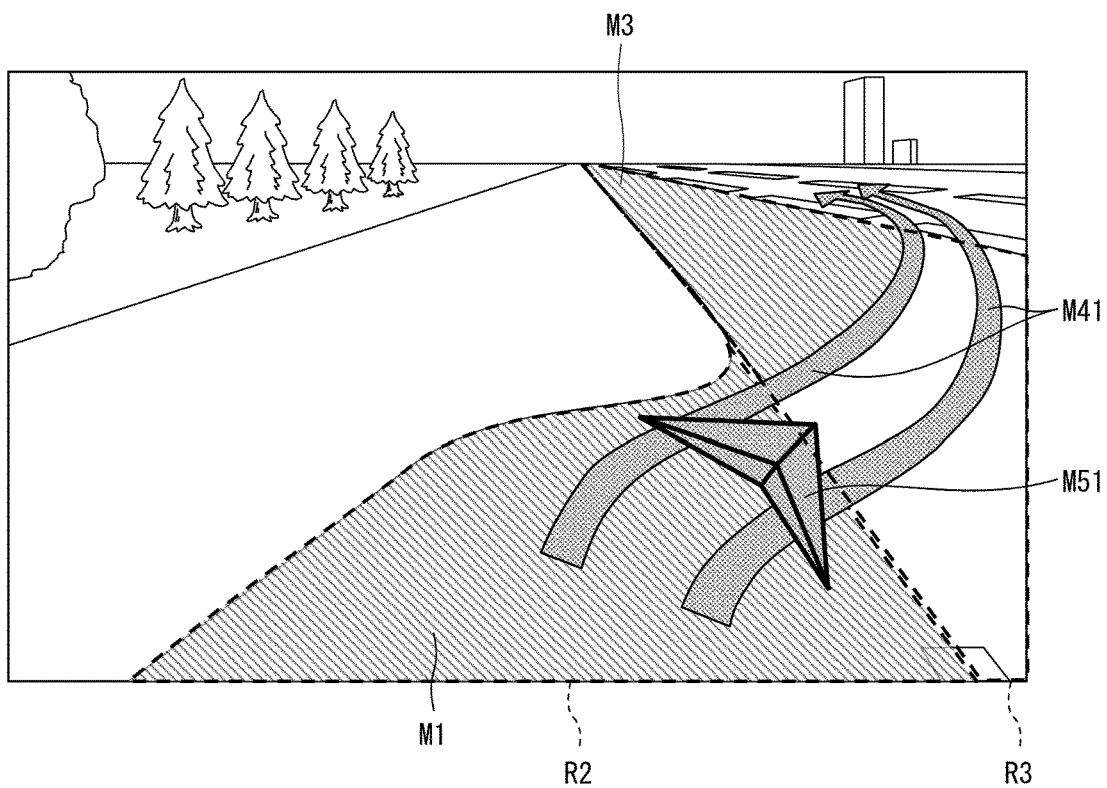
FIG. 9 is a view illustrating another example of a route image projected onto a windshield of a vehicle.

FIG. 9 is a view illustrating another example of a route image projected onto the windshield 91 of the vehicle 9. Portions of FIG. 9 that are not specifically described are similar to those of FIG. 8. In FIG. 9, there are two reduced lanes on a traveling route of the vehicle 9, namely, a lane R2 and a lane R3. In this case, the guidance image preparing section 123 prepares a route image M41 represented by two lines and supplies the route image M41 to the projection control section 125. This allows presenting the number of lane changes to be made to the driver in an intuitive manner using the number of lines of the route image.

Further, the guidance image preparing section 123 may prepare a route image emphasized to a degree corresponding to a degree of curvature or inclination of a driving lane ahead of the vehicle 9. The projection control section 125 may then cause the projection device 3 to project the route image thus emphasized. In this case, the guidance image preparing section 123 identifies the degree of curvature or inclination of the driving lane ahead of the vehicle 9 on the basis of the map data 131 and a current location. Note that the guidance image preparing section 123 may identify the degree of curvature or inclination by taking into consideration information acquired by the control section 12 from at least one of a front camera and a LiDAR 7.

For example, in a case where the curvature of the driving lane is equal to or less than a predetermined value, the guidance image preparing section 123 may generate and supply the route image M5 as illustrated in FIG. 8. In a case where the curvature of the driving lane exceeds the predetermined value, the guidance image preparing section 123 may prepare a route image M51 having an emphasized outline as illustrated in FIG. 9. Furthermore, the guidance image preparing section 123 may emphasize the outline of the route image M51 to a greater degree as the degree of curvature of the driving lane increases.

Causing the projection device 3 to project the route image M51 emphasized to a degree corresponding to the degree of curvature or inclination of the driving lane allows the driver to recognize a shape of the driving lane intuitively.

In a case where the control section 12 includes the recommended location identifying section 127, the guidance image preparing section 123 may carry out the following process.

For example, the guidance image preparing section 123 may prepare a route image at least part of which is emphasized, at a timing when the vehicle 9 passes a start-recommended location. The projection control section 125 may then cause the projection device 3 to project the route image thus emphasized. For example, the guidance image preparing section 123 may prepare the route image M51 having an emphasized outline illustrated in FIG. 9. Causing the projection device 3 to project the route image thus emphasized allows the driver to easily recognize a timing of making a lane change.

Figure 10:
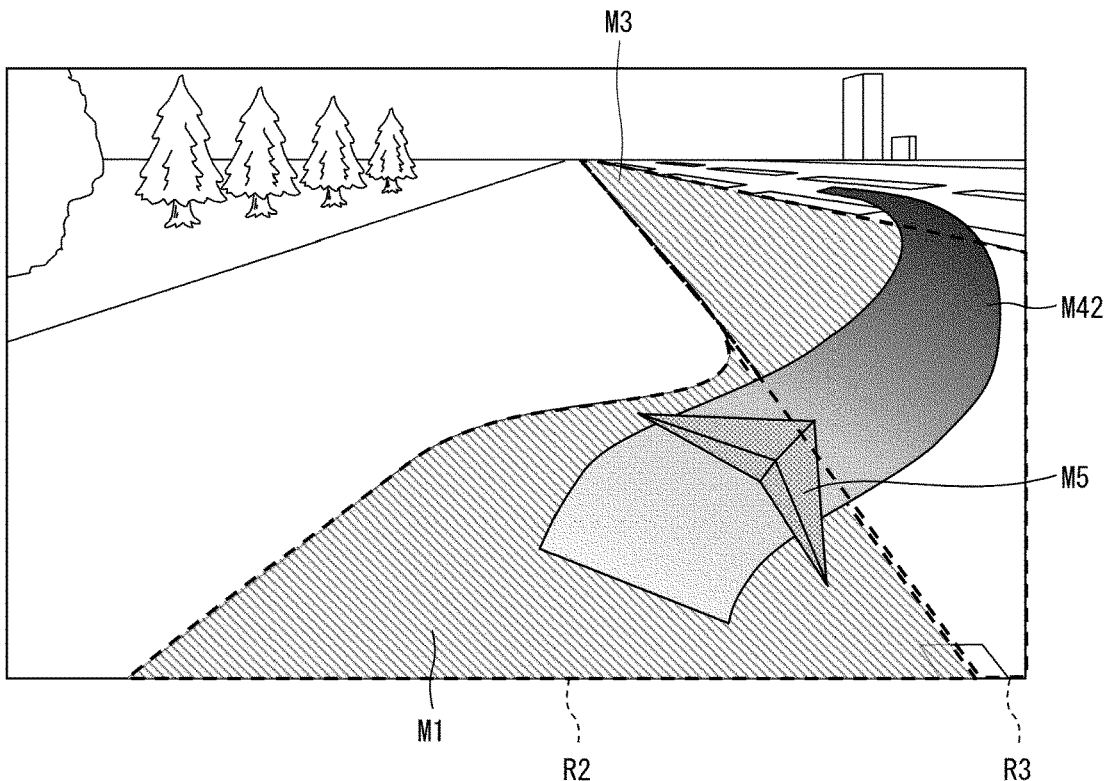
FIG. 10 is a view illustrating another example of a route image projected onto a windshield of a vehicle.

Further, the guidance image preparing section 123 may prepare a route image including a predetermined animation at a timing when the vehicle 9 passes a start-recommended location. The projection control section 125 may then cause the projection device 3 to project the route image. FIG. 10 is a view illustrating another example of a route image projected onto the windshield 91 of the vehicle 9. Portions of FIG. 10 that are not specifically described are similar to those of FIG. 8. The guidance image preparing section 123 may, for example, prepare and supply a route image M42 that indicates, using an animation that changes in color, a route to be followed by the vehicle 9 when making a lane change. Thus representing a route image using an animation allows the driver to more easily recognize a timing of making a lane change.

Figure 11:
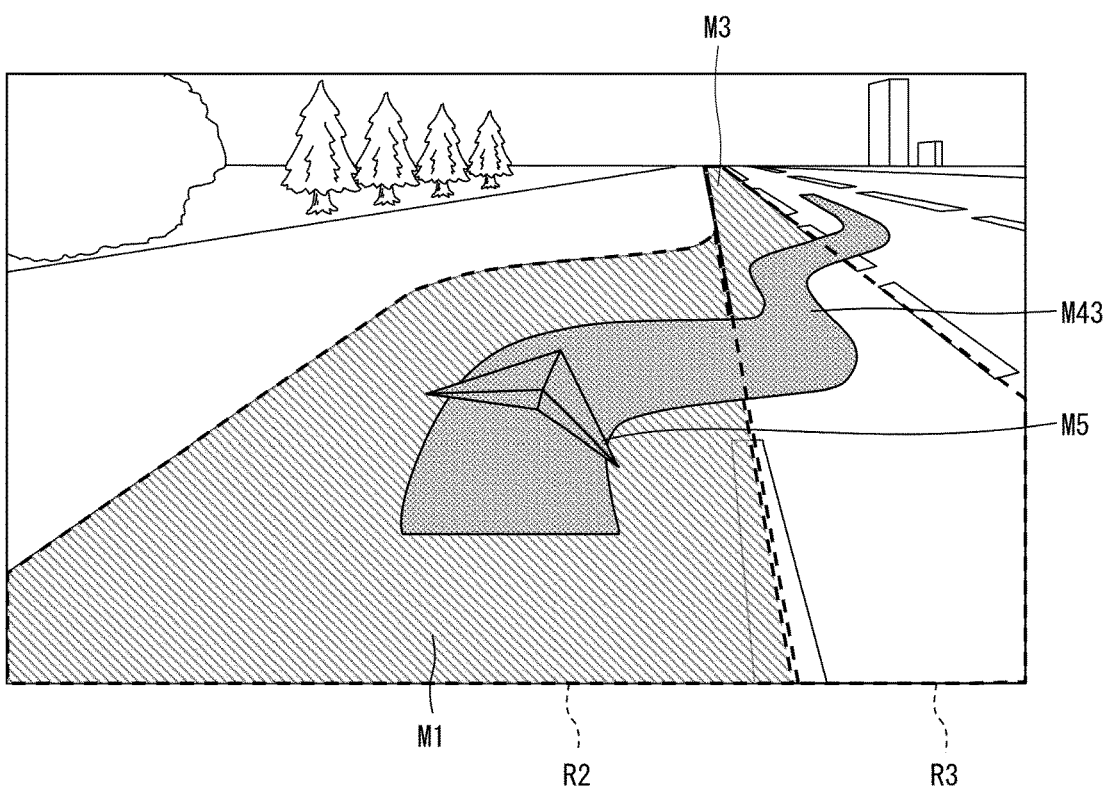
FIG. 11 is a view illustrating another example of a route image projected onto a windshield of a vehicle.

Further, the guidance image preparing section 123 may prepare a route image that bends at a start-recommended location and supply the route image to the projection control section 125. FIG. 11 is a view illustrating another example of a route image projected onto the windshield 91 of the vehicle 9. Portions of FIG. 11 that are not specifically described are similar to those of FIG. 8. The guidance image preparing section 123 may prepare a route image M43 which, as illustrated in FIG. 11, represents a route that bends at a start-recommended location in each of the reduced lanes toward the next lane. The projection control section 125 may then cause the projection device 3 to project the route image M43 thus bending. This allows the driver to recognize a start-recommended location intuitively. Accordingly, it is possible to prompt the driver to start a lane change at an appropriate timing.

Note that specific aspects of the route images described above and specific examples of effects added to the route images may be implemented in combinations. For example, the guidance image preparing section 123 may prepare and supply, at a timing when the vehicle 9 passes a start-recommended location, a route image which is represented by a certain number of lines corresponding to the number of lanes as counted from the driving lane to the recommended lane, which includes an animation, and at least part of which is emphasized.

Method for Preparing Route Image

Figure 12:
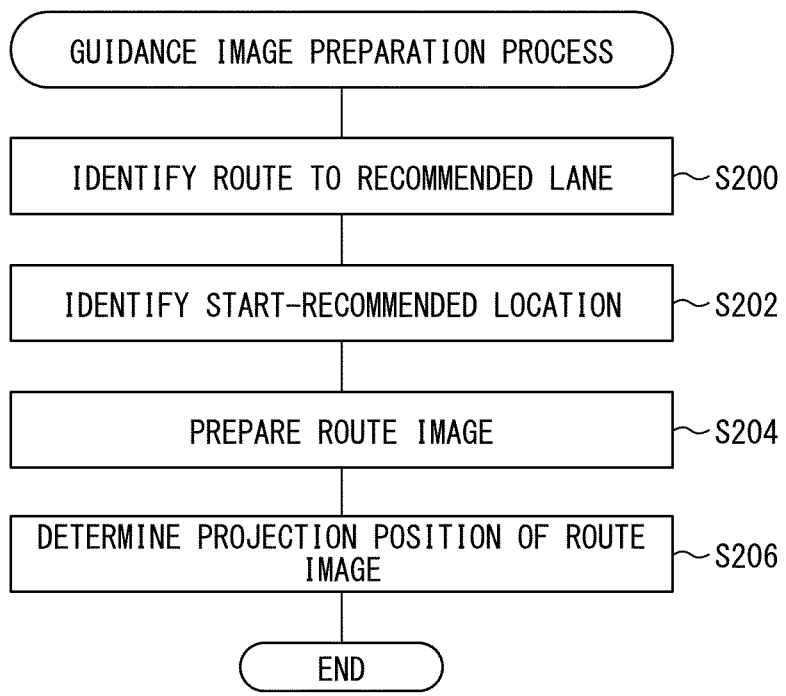
FIG. 12 is a flow chart showing another example of a flow of a guidance image preparation process.

FIG. 12 is a flow chart showing another example of a flow of a guidance image preparation process. The flow chart of FIG. 12 shows an example of a flow of a process for preparing a route image, which is a type of guidance image. Further, the flowchart of FIG. 12 shows an example of a guidance image preparation process in a case where the control section 12 includes the recommended location identifying section 127.

In a case where the driving lane is a reduced lane (YES in S12 of FIG. 4), the route identifying section 126 of the guidance image preparing section 123 identifies a route to a recommended lane (S200). Upon identifying the route, the recommended location identifying section 127 identifies a start-recommended location on the route (S202). Upon identifying the start-recommended location, the guidance image preparing section 123 prepares a route image in accordance with the route identified by the route identifying section 126 (S204). At this time, the guidance image preparing section 123 may prepare the route image such that the route image bends at start-recommended locations which have been identified, as exemplified by the route image M43 illustrated in FIG. 11. The guidance image preparing section 123 supplies the route image thus prepared to the projection control section 125. The projection control section 125 determines a projection position of the route image received from the guidance image preparing section 123 (S206). Subsequently, as shown in FIG. 4, the projection control section 125 transmits, to the projection device 3, the route image and information indicative of the projection position of the route image, and the projection device 3 projects the route image onto the projection position thus designated.

Through the above process, a recommended route for making a lane change is projected superimposed on a real view. This allows the driver to intuitively understand the route for making a lane change.

Embodiment 4

In a projection system in accordance with an embodiment of the present invention, a control section 12 of a navigation device 1 may identify, on the basis of change over time in current location, a timing at which a vehicle makes a lane change. A projection control section 125 may then cause a projection device 3 to project, in accordance with the timing and as a guidance image, a direction guide image indicative of a traveling direction of a vehicle 9. The following description will discuss Embodiment 4 of the present invention.

Configurations of Main Parts

Figure 13:
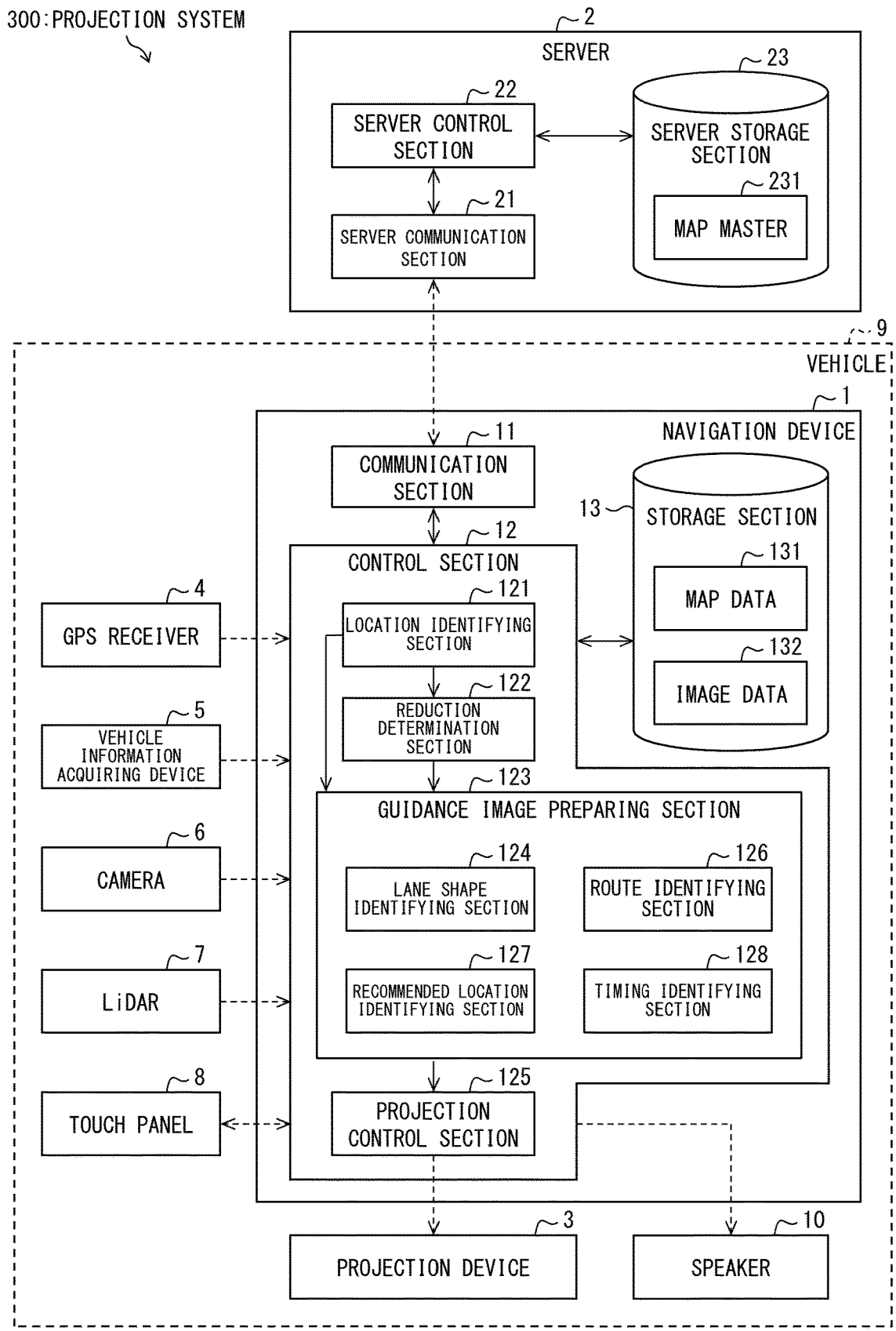
FIG. 13 is a block diagram illustrating configurations of main parts of various devices included in a projection system in accordance with Embodiment 4 of the present invention.

FIG. 13 is a block diagram illustrating configurations of main parts of various devices included in a projection system 300 in accordance with Embodiment 4. The projection system 300 differs from the projection systems 100 in accordance with Embodiments 1 and 2 and the projection system 200 in accordance with Embodiment 3 in that a guidance image preparing section 123 of a control section 12 includes a timing identifying section 128.

In Embodiment 3, the guidance image preparing section 123 prepares a direction guide image as a type of guidance image. The guidance image preparing section 123 in accordance with Embodiment 3 includes the timing identifying section 128. The timing identifying section 128 identifies a timing at which a vehicle makes a lane change, on the basis of change over time in current location acquired by the guidance image preparing section 123 at predetermined time intervals.

The method for identifying the timing of making a lane change is not particularly limited. For example, the timing identifying section 128 may identify a vehicle speed of a vehicle 9 on the basis of change over time in current location occurring at predetermined time intervals. Alternatively, the timing identifying section 128 may identify the vehicle speed of the vehicle 9 from vehicle information obtained from the vehicle information acquiring device 5. Then, in a case of making a lane change at the vehicle speed thus identified, the timing identifying section 128 may identify a timing appropriate for turning a steering wheel of the vehicle 9.

The guidance image preparing section 123 prepares a direction guide image that indicates a traveling direction of the vehicle 9. The direction guide image preparing section 123 supplies the direction guide image thus prepared to the projection control section 125. The projection control section 125 causes the projection device 3 to project the direction guide image in accordance with the timing identified by the timing identifying section 128. Here, to "project the direction guide image in accordance with the timing" means, for example, to project the direction guide image over a predetermined period before and after the timing of the lane change.

Example of Projection of Direction Guide Image

Figure 14:
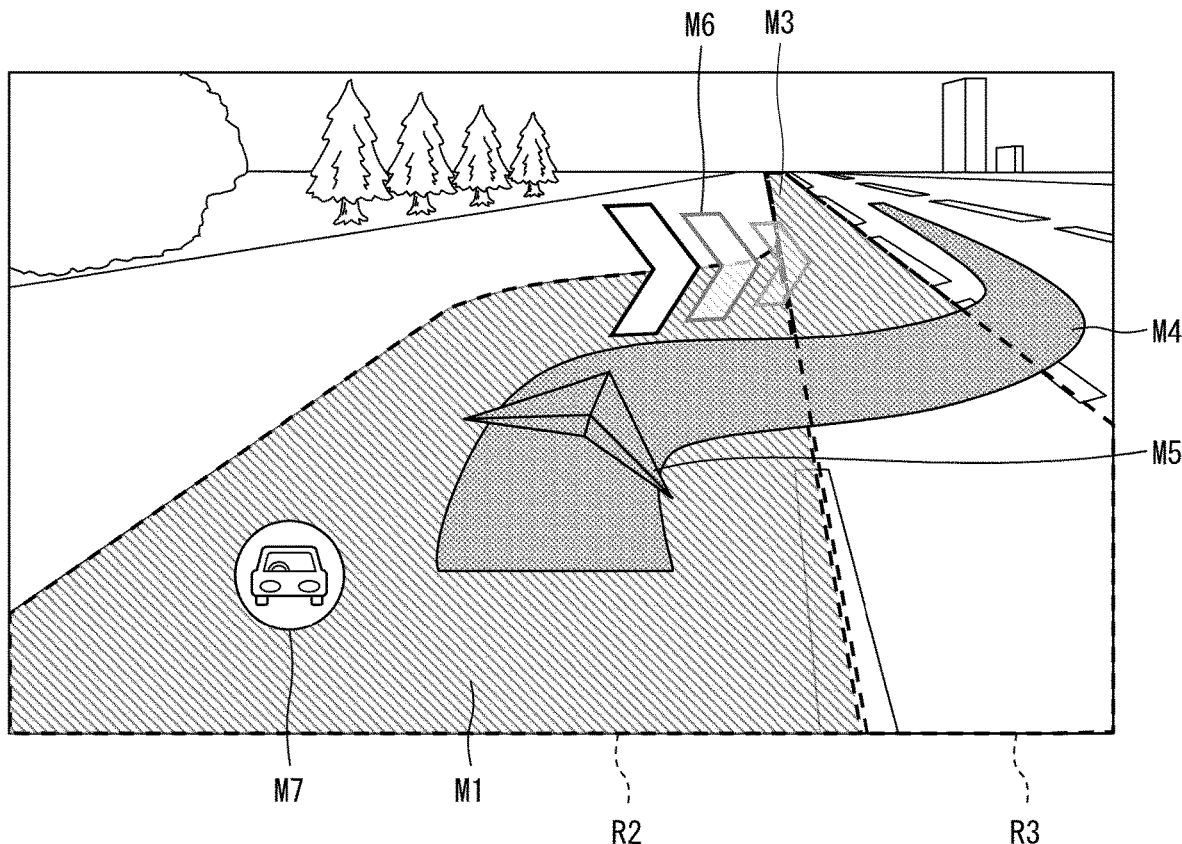
FIG. 14 is a view illustrating an example of a direction guide image projected onto a windshield of a vehicle.

FIG. 14 is a view illustrating an example of a direction guide image projected onto a windshield 91 of the vehicle 9. Note that portions of FIG. 14 that are not specifically described are similar to those of FIG. 8. The projection control section 125 in accordance with Embodiment 4 transmits, to the projection device 3, a direction guide image M6 together with information designating a projection position of the direction guide image M6. The projection device 3 receives the direction guide image M6 and projects the direction guide image M6 onto the projection position designated by the information.

As illustrated in FIG. 14, when viewed from a driver, the direction guide image M6 is projected onto the windshield 91 so as to be superimposed on a real view and point to a traveling direction at the time of making a lane change. This enables prompting the driver to turn a steering wheel at a location indicated by the direction guide image M6 being projected and in the direction indicated by the direction guide image M6.

Note that it is preferable that the direction guide image M6 differ in color from the road itself and from an indication of white lines or road signs. This is to prevent confusing the direction guide image M6, which is a virtual image, with an actual indication of transportation guide in a real view. Projecting the direction guide image M6 in this manner allows the driver to intuitively understand a timing of making a lane change. As shown in FIG. 14, the direction guide image M6 may be an image represented by an animation having a gradation of colors, light and shade, or the like.

Note that the guidance image preparing section 123 may identify whether or not a following vehicle is present within a predetermined distance behind the vehicle 9 on the basis of a captured image from a back camera serving as a camera 6. In a case where a following vehicle is present, the guidance image preparing section 123 may prepare a following vehicle icon M7 as a type of guidance image and supply the following vehicle icon M7 to the projection control section 125. The projection control section 125 may then cause the projection device 3 to project the following vehicle icon M7. Note that when identifying whether or not a following vehicle is present, the guidance image preparing section 123 may take into account information obtained from measurement carried out by an LiDAR 7 with respect to a side behind the vehicle 9.

Generally, vehicles slow down when making a lane change. As such, in a case where a following vehicle is present when a vehicle makes a lane change, the lane change must be carried out with attention to a behavior of the following vehicle. According to the above configuration, in a case where a following vehicle is present while the vehicle 9 is running on a reduced lane, the driver can be informed of the presence of the following vehicle by the following vehicle icon M7. This makes it possible to prompt the driver to make a lane change more safely.

Note that the guidance image preparing section 123 may prepare the direction guide image M6 in a color that varies depending on an amount of time left until a timing of making a lane change identified by the timing identifying section 128 and supply the direction guide image M6 to the projection control section 125. The projection control section 125 may cause the projection device 3 to sequentially project direction guide images M6 thus supplied. The amount of time left from a current time until the timing of making a lane change can be determined according to a current location and a vehicle speed of the vehicle 9. Note that the vehicle speed of the vehicle 9 can be calculated from a distance by which the current location shifts per unit time or from vehicle information such as vehicle speed pulse acquired from the vehicle information acquiring device 5.

For example, the guidance image preparing section 123 may sequentially change a color of a direction guide image as described below. In the following example, it is assumed that "first threshold">"second threshold">"third threshold">0. The guidance image preparing section 123 prepares a blue direction guide image in a case where the amount of time left until the timing of making a lane change is less than a predetermined first threshold. The direction guide image preparing section 123 supplies the blue direction guide image thus prepared to the projection control section 125. In a case the amount of time left until the timing of making a lane change is less than a second threshold, the guidance image preparing section 123 prepares a yellow direction guide image and supplies the yellow direction guide image to the projection control section 125. Further, in a case where the amount of time left until the timing of making a lane change is less than a third threshold, the guidance image preparing section 123 prepares a red direction guide image and supplies the red direction guide image to the projection control section 125. Thus indicating the amount of time left until the timing of making a lane change by a color of a direction guide image allows the driver to intuitively recognize the amount of time left until the timing of making a lane change arrives.

Method for Preparing Direction Guide Image

Figure 15:
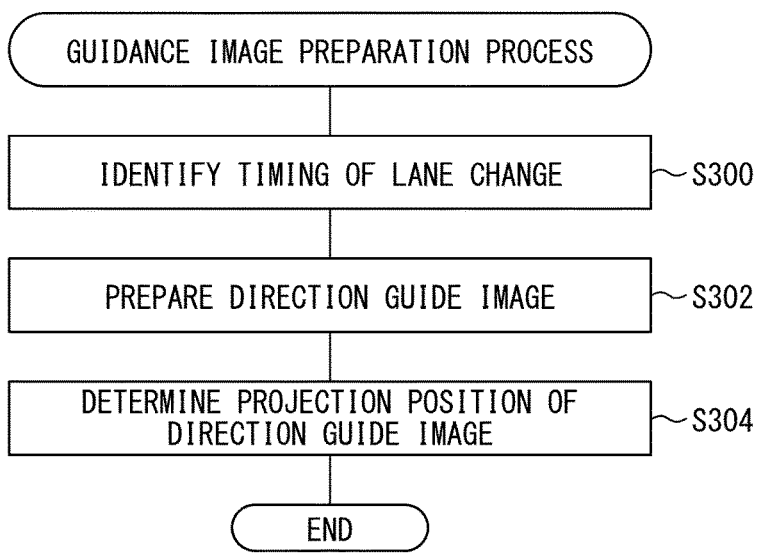
FIG. 15 is a flow chart showing another example of a flow of a guidance image preparation process.

FIG. 15 is a flow chart showing another example of a flow of a guidance image preparation process. The flow chart of FIG. 15 shows an example of a flow of a process for preparing a direction guide image, which is a type of guidance image.

In a case where the driving lane is a reduced lane (YES in S12 of FIG. 4), the timing identifying section 128 of the guidance image preparing section 123 identifies a timing of making a lane change (S300). Upon identifying the timing, the guidance image preparing section 123 prepares a direction guide image (S302). The direction guide image preparing section 123 supplies the direction guide image thus prepared to the projection control section 125. The projection control section 125 determines a projection position of the direction guide image received from the guidance image preparing section 123 (S304). Subsequently, as shown in FIG. 4, the projection control section 125 transmits, to the projection device 3, the direction guide image and information indicative of the projection position of the direction guide image. The projection device 3 projects the direction guide image onto the projection position designated by the information.

Through the above process, a timing of making a lane change is projected superimposed on a real view. This allows the driver to intuitively understand the timing for making a lane change.

Variation

The various types of guidance images described in Embodiments 1 through 4 may be projected at the same time. For example, the colored images M1 and M3, the lane guidance image M2, the route images M4 and M5, the direction guide image M6, and the following vehicle icon M7 may be projected simultaneously.

Aspects of the present invention can also be expressed as follows:

(1) A control device in accordance with an aspect of the present invention is a control device for controlling a projection device configured to project an image onto a windshield of a vehicle so that the image is displayed superimposed on a real view. The control device includes a projection control section configured to cause, in a case where a driving lane of the vehicle is a reduced lane, the projection device to project a guidance image for prompting a lane change. The reduced lane is a lane on which it becomes impossible for the vehicle to run within a predetermined distance ahead of a current location of the vehicle on a traveling route of the vehicle.

(2) A control device in accordance with an aspect of the present invention may further include a reduction determination section configured to determine, at predetermined time intervals, whether or not the driving lane is the reduced lane. Further, the projection control section may be configured to cause the projection device to end projection of the guidance image, in a case where the reduction determination section determines, after the projection device starts the projection of the guidance image, that the driving lane is not the reduced lane.

(3) A control device in accordance with an aspect of the present invention may further include a lane shape identifying section configured to identify a shape of the reduced lane in the real view on the basis of the current location, in a case where the driving lane is the reduced lane. Further, the projection control section may be configured to cause the projection device to project a colored image such that the colored image is superimposed on a position at which the reduced lane is provided in the real view. The colored image is the guidance image which is colored and, when projected onto the windshield, has the same shape as the reduced lane in the real view.

(4) A control device in accordance with an aspect of the present invention may further include a route identifying section. The route identifying section is configured to identify on the basis of the current location, in a case where the driving lane is the reduced lane, a route for making a lane change from the driving lane to a recommended lane which is recommended as a destination of the lane change. Further, the projection control section may be configured to cause the projection device to project, as the guidance image, a route image indicative of the route.

(5) A control device in accordance with an aspect of the present invention may be configured such that the route identifying section is configured to update the route at predetermined time intervals. Further, the projection control section may be configured to cause, each time the route is updated, the projection device to project the route image to which a shading effect is added.

(6) A control device in accordance with an aspect of the present invention may further include a recommended location identifying section. The recommended location identifying section is configured to identify a start-recommended location in a case where one or more other lanes are present between the driving lane and the recommended lane on the route identified by the route identifying section, the start-recommended location being a recommended location from which to start the lane change. Further, the projection control section may be configured to cause the projection device to project the route image which bends at the start-recommended location.

(7) A control device in accordance with an aspect of the present invention may further include a location identifying section. The location identifying section is configured to identify the current location at predetermined time intervals on the basis of location information of the vehicle. Further, the projection control section may be configured to cause the projection device to project the route image including a predetermined animation, at a timing when the current location passes the start-recommended location.

(8) A control device in accordance with an aspect of the present invention may be configured such that the projection control section is configured to cause the projection device to project the route image represented by a certain number of lines, the certain number being in accordance with the number of lanes as counted from the driving lane to the recommended lane.

(9) A control device in accordance with an aspect of the present invention may be configured such that the projection control section is configured to cause the projection device to project the route image at least part of which is emphasized, at a timing when the current location passes the start-recommended location.

(10) A control device in accordance with an aspect of the present invention may be configured such that the projection control section is configured to cause the projection device to project the route image the at least part of which is emphasized to a degree corresponding to a degree of curvature or inclination of the driving lane ahead of the vehicle.

(11) A control device in accordance with an aspect of the present invention may further include a location identifying section and a timing identifying section. The location identifying section is configured to identify the current location at predetermined time intervals on the basis of location information of the vehicle. The timing identifying section is configured to identify, on the basis of change over time in the current location, a timing at which the vehicle makes the lane change. Further, the projection control section may be configured to cause the projection device to project, as the guidance image and in accordance with the timing, a direction guide image indicative of a traveling direction of the vehicle.

(12) The control device in accordance with an aspect of the present invention may be configured such that the projection control section is configured to cause the projection device to project the direction guide image in a color that varies depending on an amount of time left until the timing.

Software Implementation Example

Control blocks of the control section 12 can be realized by a logic circuit (hardware) provided in an integrated circuit (IC chip) or the like or can be alternatively realized by software In the latter case, the control section 12 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: navigation device
2: server
3: projection device
4: GPS receiver
5: vehicle information acquiring device
6: camera
7: LiDAR
8: touch panel
9: vehicle
10: speaker
11: communication section
12: control section
21: server communication section
22: server control section
23: server storage section
100, 200, 300: projection system
121: location identifying section 122: reduction determination section
123: guidance image preparing section
124: lane shape identifying section
125: projection control section
126: route identifying section
127: recommended location identifying section
128: timing identifying section
131: map data
132: image data
231: map master
M1, M3: colored image
M2: lane guidance image
M4, M5: route image
M6: direction guide image
M7: following vehicle icon

The invention claimed is:

1. A control device for controlling a projection device configured to project an image onto a windshield of a vehicle so that the image is displayed superimposed on a real view that is visible to a driver of the vehicle through the windshield, the control device comprising
at least one processor,
the at least one processor being configured to perform:
projection control processing for causing, in a case where a driving lane of the vehicle is a reduced lane, the projection device to project a guidance image for prompting a lane change;
lane shape identifying processing for, in a case where the driving lane is the reduced lane, identifying a gradient shape of the reduced lane in the real view that is visible to a driver of the vehicle through the windshield on the basis of a current location of the vehicle,
the reduced lane being a lane on which it becomes impossible for the vehicle to run within a predetermined distance ahead of the current location on a traveling route of the vehicle,
in the projection control processing, the at least one processor being configured to cause the projection device to project a colored image such that the colored image is superimposed on a position at which the reduced lane is provided in the real view that is visible to a driver of the vehicle through the windshield,
the colored image being the guidance image which is colored and, when projected onto the windshield, has the same shape as the gradient shape, identified in the lane shape identifying processing, of the reduced lane in the real view that is visible to the driver of the vehicle through the windshield,
wherein the reduced lane disappears when integrated into another lane within the predetermined distance ahead of the vehicle, and
wherein, the reduced lane includes the real view and an actual view which comes into sight of the driver through the windshield, and is not an image generated by electromagnetic editing image data which is a captured image of the real view.

2. The control device as set forth in claim 1, wherein the at least one processor is further configured to:
perform reduction determination processing for determining, at predetermined time intervals, whether or not the driving lane is the reduced lane; and
in the projection control processing, cause the projection device to end projection of the guidance image, in a case where, in the reduction determination processing, it is determined, after the projection device starts the projection of the guidance image, that the driving lane is not the reduced lane.

3. The control device as set forth in claim 1, wherein the at least one processor is further configured to:
perform route identifying processing for identifying on the basis of the current location, in a case where the driving lane is the reduced lane, a route for making a lane change from the driving lane to a recommended lane which is recommended as a destination of the lane change; and
in the projection control processing, to cause the projection device to project, as the guidance image, a route image indicative of the route.

4. The control device as set forth in claim 3, wherein the at least one processor is further configured to:
in the route identifying processing, update the route at predetermined time intervals; and
in the projection control processing, cause, each time the route is updated, the projection device to project the route image to which a shading effect is added.

5. The control device as set forth in claim 3, wherein the at least one processor is further configured to:
perform recommended location identifying processing for identifying a start-recommended location in a case where one or more other lanes are present between the driving lane and the recommended lane on the route identified in the route identifying processing, the start-recommended location being a recommended location from which to start the lane change; and
in the projection control processing, cause the projection device to project the route image which bends at the start-recommended location.

6. The control device as set forth in claim 5, wherein the at least one processor is further configured to:
perform location identifying processing for identifying the current location at predetermined time intervals on the basis of location information of the vehicle; and
in the projection control processing, cause the projection device to project the route image including a predetermined animation, at a timing when the current location passes the start-recommended location.

7. The control device as set forth in claim 5, wherein the at least one processor is further configured to
in the projection control processing, cause the projection device to project the route image represented by a certain number of lines, the certain number being in accordance with the number of lanes as counted from the driving lane to the recommended lane.

8. The control device as set forth in claim 7, wherein the at least one processor is further configured to
in the projection control processing, cause the projection device to project the route image at least part of which is emphasized, at a timing when the current location passes the start-recommended location.

9. The control device as set forth in claim 8, wherein the at least one processor is further configured to
in the projection control processing, cause the projection device to project the route image the at least part of which is emphasized to a degree corresponding to a degree of curvature or inclination of the driving lane ahead of the vehicle.

10. The control device as set forth in claim 1, wherein the at least one processor is further configured to perform:

location identifying processing for identifying the current location at predetermined time intervals on the basis of location information of the vehicle; and timing identifying processing for identifying, on the basis of change over time in the current location, a timing at which the vehicle makes the lane change, and in the projection control processing, cause the projection device to project, as the guidance image and in accordance with the timing, a direction guide image indicative of a traveling direction of the vehicle.

11. The control device as set forth in claim 10, wherein the at least one processor is further configured to in the projection control processing, cause the projection device to project the direction guide image in a color that varies depending on an amount of time left until the timing.

12. The control device as set forth in claim 1, wherein the at least one processor is further configured to, in the projection control processing, cause the projection device to project the guidance image when the vehicle enters a lane which is included in the reduced lane and on which it is impossible for the vehicle to run or when the vehicle is running on a lane which is included in the reduced lane and on which it is impossible for the vehicle to run.

* * * * *